No. 664,937. Patented Jan. 1, 1901.
A. FISCHER.
FRICTION CLUTCH.
(Application filed Feb. 19, 1900.)
(No Model.)
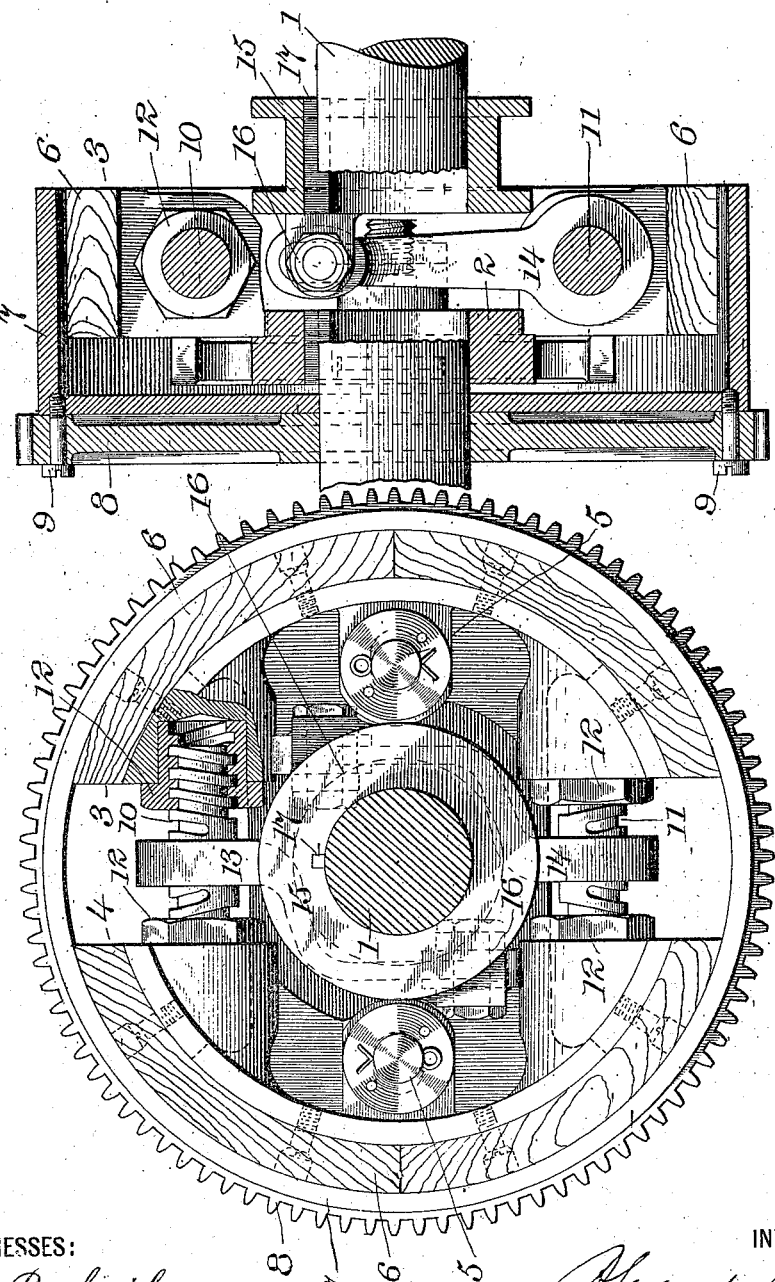
WITNESSES:
INVENTOR
Alexander Fischer
BY
ATTORNEY

UNITED STATES PATENT OFFICE.

ALEXANDER FISCHER, OF NEW YORK, N. Y.

FRICTION-CLUTCH.

SPECIFICATION forming part of Letters Patent No. 664,937, dated January 1, 1901.

Application filed February 19, 1900. Serial No. 5,772. (No model.)

*To all whom it may concern:*

Be it known that I, ALEXANDER FISCHER, a citizen of the United States of America, and a resident of New York city, county of New York, State of New York, have invented certain new and useful Improvements in Friction-Clutches, of which the following is a specification.

My invention relates to friction-clutches in general; and it more specifically consists of an improved quick-action friction-clutch for use on the driving-gear of an automobile carriage.

The preferred form of apparatus embodying my invention is illustrated in the accompanying sheet of drawings, in which—

Figure 1 is a side elevation of the clutch. Fig. 2 is a vertical central section in the plane of the axis of the shaft.

Throughout the drawings like reference-figures refer to like parts.

The power-shaft 1, shown partly broken away in Fig. 2, has the shoe-carrying frame 2 keyed thereon, so as to revolve with it. The segmental shoes 3 4 are mounted on said frame 2 and movable thereon radially of the shaft 1 by means of the pin-and-slot connections 5 5. Said shoes have, preferably, a facing 6, of wood or other material, which will most effectively coöperate with the hollow metal pulley 7, within which the shoes are located, which said hollow pulley is loosely mounted on the shaft 1, but rigidly fastened to gear-wheel 8. Preferably said gear-wheel is of approximately the same diameter as the pulley 7 and is fastened thereto by a series of screws 9 9 passing through the periphery of both the gear-wheel and the pulley.

The means for expanding the shoes 3 4 within the hollow pulley 7 preferably consist of the right and left hand screws 10 and 11, which mesh with the correspondingly-threaded nuts 12 12, set into the shoes 3 4. The screw-shaft 10 has a bent lever-arm 13 projecting from it, and the screw-shaft 11 has an oppositely-bent lever-arm 14 projecting from it. The outer ends of these lever-arms are preferably connected to a sliding collar 15 on the main shaft by means of the pin-and-slot connections 16 16. This sliding collar is loosely keyed to the shaft 1, as shown at 17, so as to revolve with said shaft, but to slide axially thereon.

The method of operating my invention is as follows: A forked lever or any other device (not shown) fitting into the groove of the sliding collar 15 enables the operator to slide the same axially on the power-shaft 1. When the parts are in the position shown in Figs. 1 and 2, the oppositely-threaded screw-shafts 10 and 11 are so turned as to force the segmental screws 3 and 4 apart and bind them tightly against the interior surface of the hollow pulley 7. Accordingly the shoe-carrying frame 2, the shoes, and the loose pulley 7 are all bound together and revolve with the shaft 1, the power being consequently transmitted to the gear-wheel 8. If, however, the sliding collar 15 were moved to the right, (see Fig. 2,) the lever-arms 13 14 would be turned in that direction and the oppositely-threaded screws 10 and 11 would be partly forced into the nuts 12 12, embedded in the shoes, and accordingly said shoes would be drawn together and freed from frictional contact with the interior of the hollow pulley 7. Said pulley would accordingly be free to remain stationary while the shoes revolved idly within it, and no power would be transmitted to gear 8.

The advantages of my invention consist in the quick action of the clutch, resulting from the use of the double-threaded screws, and the even operation of the expansion apparatus, resulting from the fact that the segmental shoes are always preserved parallel one to the other and move along parallel lines, whereby any binding of the moving parts is prevented, in the self-contained nature of the construction, all levers and moving parts except the sliding collar 15 being within the hollow pulley 7, where they will not catch on any object placed near the clutch, and in the combination of strength with lightness resulting from the method of fastening the driving-gear to the loose pulley at the peripheries of these two elements.

It is evident, of course, that various changes could be made in the details of construction illustrated without departing from the spirit and scope of my invention so long as the relative arrangement of parts shown in the drawings or the principle of operation disclosed in the specification is preserved.

Other means of expanding the segmental shoes might be employed, and different connections of the screws and levers might be substituted. The transmission of power might be from gear-wheel to shaft instead of from shaft to gear-wheel, and the means for transmitting motion from the hollow pulley to the driven mechanism might be other than the gear-wheel illustrated; but all these modifications I consider within the scope of my invention.

Having therefore described my invention, what I claim as new, and desire to protect by Letters Patent, is—

In a friction-clutch, the combination of the power-shaft, the hollow pulley, two segmental shoes fitting into the interior of the pulley, mounted on and revolving with the power-shaft, the right and left hand screws connecting said segmental shoes, an axially-sliding collar on the power-shaft, lugs on said collar projecting into the interior of the hollow pulley, pins on said lugs, and a bent lever-arm extending from each right and left hand screw part way around the shaft to the opposite lug on the sliding collar and provided with a slot extending lengthwise of the lever, which slot meshes with the pinion on the lug.

Signed by me at Jersey City, New Jersey, this 14th day of February, 1900.

ALEXANDER FISCHER.

Witnesses:
 GEO. B. ADAMS,
 W. H. PUMPHREY.